United States Patent Office 3,666,563

Patented May 30, 1972

1

3,666,563

ELECTRODE FABRICATION

Ahmad Sam, Paramus, N.J., assignor to Standard Oil Company, Chicago, Ill.

No Drawing. Filed Mar. 16, 1970, Ser. No. 20,086

Int. Cl. H01m 13/04

U.S. Cl. 136—120 FC 8 Claims

ABSTRACT OF THE DISCLOSURE

A process for the fabrication of a fuel cell electrode, said process comprising: (1) adding an acid to a mixture of (a) supported catalyst-containing particles, (b) a material which will react exothermally with said acid when reaction is initiated, and (c) a polymeric thermoplastic; (2) heating the acid mixture to a temperature sufficient to set off said exothermic reaction between the acid and the reactive material, causing the thermoplastic to become fluid and adherent; and (3) subjecting the reacted acid mixture to pressure, thus bonding said particles together.

BACKGROUND OF THE INVENTION

The efficient operation of a fuel cell requires an electrode, with catalyst, highly dispersed, to provide as many reaction sites as possible for the fuel and oxidant. To most effectively fabricate a catalyst-containing electrode with a high surface area, the electrode components, in particulate form, are usually bonded together to form a highly porous structure.Many bonding procedures are known in the art. These procedures generally involve one of two methods: (1) use of an inert polymeric thermoplastic functioning as an adhesive to hold the particles together, or (2) compression of the particles to form a mechanical type bond. (As used in the specification and claims the word "inert" describes a material which is not attacked by the fuel cell electrolyte and does not enter into the electron-producing reaction.)

Combinations of the two methods are also known in the art. Such combinations are effective because of contributions to the particle-to-particle bonds from both the mechanical bonding and the adhesive bonding. Often, the mechanical bonding of the particles is considered to be less important, since it requires high compression of the electrode particles, which reduces the surface area of the finished electrode. A major portion of the bonding is then effected by using an inert polymeric thermoplastic. Such a thermoplastic may be described as non-wettable, inert, insoluble, and acid-resistant. Such properties are commonly identified with polyperfluorohydrocarbons and polyolefins. Examples of these are polytetrafluoroethylene (Teflon), polytrifluorochloroethylene, polyethylene, polypropylene and mixtures thereof. Since these materials generally soften at low temperatures (100–300° F.), pressing using heated platens (hot pressing) can be employed to enable the mechanical and adhesive bonds to be established in a single operation.

Hot pressing has been used extensively in the past although it has not been entirely successful. The polymeric thermoplastic becomes fluid and adherent at higher temperatures, allowing good adhesive particle-to-particle bonds and offering little resistance to the particle movement accompanying formation of mechanical type bonds. Hot pressing is inefficient, however, because the heat source is far removed from the adhesive to be heated. Hot pressing also results in poor bonds because of poor heat transfer within the electrode during its formation.

SUMMARY OF THE INVENTION

I have now discovered a process for fabricating a fuel cell electrode which includes producing heat, in situ,

2 sufficient to soften Teflon or some other polymeric thermoplastic suitable for forming adhesive particle-to-particle bonds. The process may be used effectively to bond together the catalyst-containing particles of fuel cell electrodes described in U.S. Pat. 3,429,750, which is hereby incorporated by reference. Briefly, in the process of the present invention, a suitable acid is added to a mixture of electrode components including: (a) supported catalyst-containing particles, (b) a material exothermally reactive with said acid, and (c) a polymeric thermoplastic. (Initially, upon addition of the acid to the mixture, some water is formed and some heat is given off by the recation between the most readily ionizable hydrogen ions of the acid and a minor portion of the exothermally reactive material, but the heat is insufficient to cause the polymeric thermoplastic to become fluid and adherent.) The acid mixture is then heated to a temperature sufficient to set off a reaction between the acid and the exothermally reactive material, causing the polymeric thermoplastic to become fluid and adherent thus bonding the catalyst-containing particles together. The heated mixture is then subjected to pressure to further bond the components together. The heated mixture now forming a fuel cell electrode may be further subjected to the additional steps of: (1) leaching out the unreacted reactive material, (2) drying the electrode, and (3) hot pressing the electrode; however, these steps are not necessary to form an adequate electrode.

The acid mixture may be applied to an electrically conductive electrode support before the chemical reaction is initiated; the catalyst-containing particles will then be bonded to the support as well as to each other. The support may be treated to enhance the subsequent bonding of the catalyst-containing particles to it by (1) gold plating or (2) degreasing with a suitable organic solvent, such as methylethylketone. For convenience, it may be desirable to form a soft paste of the acid mixture. In forming such a paste, water is preferred. The paste applied to the support is then pressed, dried, and heated to a temperature sufficient to set off an exothermic chemical reaction between the acid and the exothermally reactive composition. If stronger bonds are desired, the screen and reacted paste, which now form a single unit suitable for use as a fuel cell electrode, may be compressed further. The newly fabricated electrode may be hot pressed for even more electrode strength.

Preferred polymeric thermoplastic compositions soften between about 100° F. and 300° F. and are inert. Suitable compositions comprise perfluorohydrocarbons and polyolefins, e.g. polytetrafluoroethylene (Teflon), polytrifluorochloroethylene, polyethylene, polypropylene and mixtures thereof. An advantageous mixture for use in the novel process of the present invention comprises phosphoric acid, a graphite-supported platinum catalyst, Teflon and zinc oxide as the exothermally reactive composition.

A suitable acid for reaction is phosphoric acid or any acid having an ionization constant equal to or less than the second ionization constant of phosphoric acid. Materials exothermally reactive with such acids are preferably oxides of amphoteric metals. Less than a 1 to 1 molar ratio of oxide to acid is sufficient to provide enough heat to facilitate bonding of the catalyst supporting particles; however, the desired porosity usually dictates the amount of oxide present. Usually an ample amount is employed and any excess is leached out of the electrode after fabrication.

Other acids can be used as well as phosphoric acid if they have ionization constants equal to or less than the second ionization constant of phosphoric acid. If such is not the case, an uncontrolled spontaneous reaction may occur when the acid is added to the electrode components. Such acids include boric acid, hydrosulfurous acid, hydrocyanic acid, and hypochlorous acid. Alternatively, an acid salt, such as monobasic or dibasic zinc phosphate, may be used in place of the acid. The acid salt must, of course, have an ionization constant equal to or less than the second ionization constant of phosphoric acid to avoid the uncontrolled spontaneous reaction mentioned above. In certain of the modes of practice of the invention it may be necessary to dissolve the acid salt in water and perhaps even thicken the water solution with a suitable thickening agent such as silica gel.

Alternatively, if it is inconvenient or undesirable to mix all the ingredients prior to application to the electrode support, the support screen may first be immersed in phosphoric acid or any other suitable acid, whether or not such acid has been thickened with a suitable agent such as silica gel. It is necessary that some acid remain on the screen after immersion. The screen may then be placed between two electrode catalyst films prepared in accordance with the teachings of U.S. Patent 3,306,779 (hereby incorporated by reference) and pressed at pressures up to 100 p.s.i. A sufficient amount of heat is applied during the pressing operation to set off a chemical reaction between the acid and the zinc oxide filler material contained in the prepared catalyst films. The Teflon bonding material in the prepared catalyst films is made flowable and adherent by the heat evolved from the reaction of the filler material and the acid, bonding the catalyst films to the screen and exposing catalyst.

The process of this invention is a significant improvement upon the prior art since it allows fabrication of fuel cell electrodes at significantly reduced temperatures and pressures, resulting in more porous electrodes. It has the additional advantages of (1) providing an in situ source of heat, which is in intimate contact with the bonding material to be heated and thus eliminating heat loss due to the inefficiencies of heat transfer, and (2) disposing of the filler material in such a manner that heat is furnished while at the same time the active catalyst surface area is exposed to subsequently catalyze the fuel cell reaction. The process also has the advantages of (1) allowing use of a minimum of polymeric thermoplastic so that a minimum of space is sacrificed and a minimum of active catalyst is covered, while (2) allowing use of enough polymeric thermoplastic so that the fuel cell electrolyte does not flood the electrode and cause it to become inoperable.

PREFERRED EMBODIMENTS

Example I

Tantalum screen was coated with a paste of 10 percent catalyst-containing graphite particles, Teflon, phosphoric acid, water and zinc oxide. The paste was made as previously described from about 0.5 gram of platinum catalyst-containing graphite, about 0.2 gram Teflon, about 0.4 gram phosphoric acid (approximately .004 mole), an equal molar ratio of zinc oxide (about .33 gram) and water. After coating, the tantalum screen and paste were heated to a temperature upward from 100° C. sufficient to set off an exothermic chemical reaction between the phosphoric acid and the zinc oxide, pressed at about 100 p.s.i. for about 5 minutes, leached free of zinc oxide and dried in an oven at about 100° C. The reaction evolved sufficient heat to cause the Teflon to become fluid and adherent, thereby bonding the screen and particles together to form an electrode.

Example II

The procedure of Example I was followed except that the electrode was additionally hot pressed at 200° C. and 100 p.s.i. for 10 minutes. The resulting electrode was stronger than the electrode of Example I.

Example III

The procedure of Example I was followed except that the tantalum screen was prepared by degreasing it with a suitable organic solvent such as methylethylketone. The electrodes fabricated according to this process were found to have the graphite-supported catalyst more effectively bonded to the tantalum screen than the electrode of Example I.

Example IV

The procedure of Example I was followed except the tantalum screen was prepared by plating it with a thin film of gold. The electrodes fabricated according to this process were found to be more effectively bonded to the tantalum screen than the electrodes of Example I.

Example V

The procedure of Example I was followed except no catalyst was present in the graphite. The electrodes fabricated according to this process were found to be effectively bonded to the tantalum screen.

Example VI

The procedure of Example I is followed except that, in addition, a porous Teflon film about 1 millimeter thick is placed in the press in such a manner that, after pressing and drying, the heat of reaction softens the Teflon film, causing it to adhere to the fabricated electrode surface and preventing detachment of catalyst-containing graphite particles from the electrode surface. Porous Teflon film, suitable for this purpose, may be prepared by pressing Teflon film between two sandpaper surfaces at 150° C. and 100 p.s.i. for about 5 minutes.

Example VII

The electrode film fabrication described in U.S. Pat. No. 3,306,779, wherein the removal of the aluminum foil electrode film backing was accomplished by dissolving it in a 10 percent NaOH solution, was modified by shaking the electrode film while submerged, to cause the foil to fall off instead of allowing it to dissolve off, evolving hydrogen and eroding the film surface. A tantalum screen was dipped in phosphoric acid and then placed between two films prepared in this manner and the combination pressed at 100 p.s.i. for about 5 minutes, dried at about 100° C., and heated to a temperature sufficient to set off an exothermic chemical reaction between the phosphoric acid and the zinc oxide filler material in the films, thus fabricating a fuel cell electrode as in Example I. The excess zinc oxide was then leached out of the fabricated electrode with a strong acid or strong base, exposing a maximum of catalyst.

Example VIII

The procedure of Example VII was followed except that the electrode was additionally dried and hot pressed at about 200° C. and 100 p.s.i. for about 10 minutes. The electrodes, fabricated according to this process, were found to be more effectively bonded to the tantalum screen than in Example VII.

Example IX

The surface of a finished electrode, prepared in accordance with Example I was coated with the paste of Example I and then contacted with an electrode film prepared substantially in accordance with U.S. Patent No. 3,306,779 and pressed at about 100 p.s.i. for about 5 minutes. The electrode and the electrode film combination was dried at about 100° C. and then heated to a temperature sufficient to set off a chemical reaction between the phosphoric acid and the zinc oxide filler material in the film and of the paste to fabricate a fuel cell electrode. The electrode fabricated according to this process was comprised of laminated layers.

Example X

The procedure of Example IX was followed except that the electrodes were additionally hot pressed at about 200° C. and 100 p.s.i. for about 10 minutes. The electrode films were found to be more effectively laminated than those in Example VIII.

Example XI

The procedure of Example IX was followed except that the paste was applied to two finished electrode surfaces. The electrodes were then pressed together at about 100 p.s.i. for about 5 minutes, dried at about 100° C., and then heated to a temperature sufficient to set off a chemical reaction between the phosphoric acid and the zinc oxide filler material in the films and of the paste. A finished electrode, having two tantalum screens, was fabricated.

Example XII

Electrodes prepared as in Example XI were treated with the proper chemicals to leach out the excess zinc oxide, the electrodes were dried at about 100° C. and hot pressed at about 200° C. and 100 p.s.i.

Example XIII

The procedures of Examples IX through XI were followed except graphite particles were substituted for the supported catalyst-containing particles of the paste. The electrode films were found to be effectively laminated.

The scope of this invention is not to be construed as limited by the particular embodiments described herein.

I claim:

1. A process for the fabrication of a fuel cell electrode, said process comprising: (a) adding an acid to a mixture of electrode components, including supported catalyst-containing particles, a reactive material exothermally reactive with the acid, and a polymeric thermoplastic; (b) heating the acid mixture to a temperature sufficient to set off a reaction between the acid and the exothermally reactive material, causing the polymeric thermoplastic to become fluid and adherent; and (c) subjecting the heated mixture to pressure.

2. The process of claim 1 wherein the acid is any acid having an ionization constant equal to or less than the second ionization constant of phosphoric acid.

3. The process of claim 1 wherein the acid is phosphoric acid.

4. The process of claim 1 wherein the acid and electrode components are mixed with water to form a paste before heating to set off said exothermic reaction.

5. The process of claim 1 wherein an acid salt, dissolved in water, having an ionization constant less than the second ionization constant of phosphoric acid, is substituted for said acid.

6. The process of claim 5 wherein the acid salt is monobasic zinc phosphate or dibasic zinc phosphate.

7. The process of claim 1 wherein said material exothermally reactive with the acid is an amphoteric metal oxide compound.

8. A process for the fabrication of a fuel cell electrode comprising: (a) adding phosphoric acid to a mixture of electrode components including a graphite-supported platinum catalyst, polytetrafluorethylene, and zinc oxide; (b) inserting therein a tantalum support screen; (c) heating the acid mixture to a temperature upward from 100° C. to set off an exothermic reaction, causing the polytetrafluoroethylene to become fluid and adherent; (d) subjecting the heated mixture to pressure to further bond the components together and to the tantalum screen; (e) leaching out the unreacted zinc oxide; (f) drying said electrode at a temperature of about 100° C.; and (g) hot-pressing said electrode at about 200° C. and 100 p.s.i. for about 10 minutes.

References Cited

UNITED STATES PATENTS

| | | | |
|---|---|---|---|
| 1,991,380 | 2/1935 | Dawe | 44—3 |
| 3,266,893 | 8/1966 | Duddy | 136—120 X FC |
| 3,475,239 | 10/1969 | Fearon et al. | 149—109 |
| 3,550,578 | 12/1970 | Fearon et al. | 44—3 X |

WINSTON A. DOUGLAS, Primary Examiner

M. J. ANDREWS, Assistant Examiner

U.S. Cl. X.R.

44—3